United States Patent
Lema (10) Patent No.: US 10,789,947 B2
(45) Date of Patent: Sep. 29, 2020

(54) SYSTEMS AND METHODS FOR IDENTIFYING VOICE

(71) Applicant: GoPro, Inc., San Mateo, CA (US)

(72) Inventor: Gabriel Lema, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/721,195

(22) Filed: Dec. 19, 2019

(65) Prior Publication Data

US 2020/0126543 A1   Apr. 23, 2020

Related U.S. Application Data

(63) Continuation of application No. 16/541,494, filed on Aug. 15, 2019, now Pat. No. 10,535,340, which is a continuation of application No. 15/861,304, filed on Jan. 3, 2018, now Pat. No. 10,424,294.

(51) Int. Cl.
| | |
|---|---|
| *G10L 15/20* | (2006.01) |
| *G10L 15/02* | (2006.01) |
| *G10L 25/84* | (2013.01) |
| *G06K 9/62* | (2006.01) |
| *G10L 15/16* | (2006.01) |

(52) U.S. Cl.
CPC ............ *G10L 15/20* (2013.01); *G06K 9/6267* (2013.01); *G10L 15/02* (2013.01); *G10L 15/16* (2013.01); *G10L 25/84* (2013.01)

(58) Field of Classification Search
CPC ......... G10L 15/20; G10L 15/02; G10L 15/16; G10L 25/24; G10L 25/84; G10L 2025/783; G10L 25/78; G06K 9/6267
See application file for complete search history.

(56) References Cited

U.S. PATENT DOCUMENTS

| | | | |
|---|---|---|---|
| 2013/0054236 A1 | 2/2013 | Garcia Martinez | |
| 2015/0302853 A1* | 10/2015 | Braho | ............... G10L 25/78 704/233 |
| 2016/0284349 A1* | 9/2016 | Ravindran | ............. G10L 15/20 |
| 2017/0270919 A1* | 9/2017 | Parthasarathi | .......... G10L 15/02 |

* cited by examiner

*Primary Examiner* — Yogeshkumar Patel
(74) *Attorney, Agent, or Firm* — Esplin & Associates, PC (57) ABSTRACT

Audio information defining audio content may be accessed. The audio content may have a duration. The audio content may be segmented into audio segments. Individual audio segments may correspond to a portion of the duration. Feature vectors of the audio segments may be determined. The feature vectors may be processed through a classifier. The classifier may output scores on whether the audio segments contain voice. One or more of the audio segments may be identified as containing voice based on the scores and a two-step hysteresis thresholding. Storage of the identification of the one or more of the audio segments as containing voice in one or more storage media may be effectuated.

20 Claims, 7 Drawing Sheets

SYSTEMS AND METHODS FOR IDENTIFYING VOICE

FIELD

This disclosure relates to identifying voice based on feature vectors and a two-step hysteresis thresholding.

BACKGROUND

Audio content may include capture of voice (e.g., cheering, speech). Computer identification of voice from other sounds in audio content may be difficult and/or inaccurate.

SUMMARY

Audio information defining audio content may be accessed. The audio content may have a duration. The audio content may be segmented into audio segments. Individual audio segments may correspond to a portion of the duration. The audio segments may include a first audio segment corresponding to a first portion of the duration. Feature vectors of the audio segments may be determined. The feature vectors may include a first feature vector of the first audio segment. The feature vectors may be processed through a classifier. The classifier may output scores on whether the audio segments contain voice. One or more of the audio segments may be identified as containing voice based on the scores, a two-step hysteresis thresholding, and/or other information. Storage of the identification of the one or more of the audio segments as containing voice in one or more storage media may be effectuated.

A system that identifies voice within audio content may include one or more electronic storage, processor and/or other components. The electronic storage may store audio information defining audio content and/or other information. Audio content may refer to media content that may be consumed as one or more sounds. Audio content may include one or more sounds stored in one or more formats/containers, and/or other audio content. Audio content may have a duration. In some implementations, audio content may include audio portion of video content. Audio content may be captured during capture of the video content.

The processor(s) may be configured by machine-readable instructions. Executing the machine-readable instructions may cause the processor(s) to facilitate identifying voice within audio content. The machine-readable instructions may include one or more computer program components. The computer program components may include one or more of an audio information component, a segment component, a feature vector component, a classifier component, a voice component, a storage component, and/or other computer program components.

The audio information component may be configured to access audio information defining one or more audio content and/or other information. The audio information component may access audio information from one or more locations. The audio information component may access audio information during acquisition of the audio content and/or after acquisition of the audio content by one or more sound sensors.

The segment component may be configured to segment the audio content into audio segments. Individual audio segments may correspond to a portion of the duration of the audio content. The audio segments may include a first audio segment corresponding to a first portion of the duration and/or other audio segment(s) corresponding to other portion(s) of the duration. In some implementations, the audio segments may have a duration of twenty-five milliseconds.

The feature vector component may be configured to determine feature vectors of the audio segments. The feature vectors may include a first feature vector of the first audio segment and/or other feature vector(s) of other audio segment(s). In some implementations, the feature vectors may be determined based on application of one or more Mel filter banks. A Mel filter bank may be expanded or contracted, and scaled based on a sampling rate of the audio content.

The classifier component may be configured to process the feature vectors and/or other information through one or more classifiers. The classifier(s) may output scores on whether the audio segments contain voice and/or other information. In some implementations, a classifier may include a random forest classifier or a recurrent neural network (e.g., Long Short Term Memory network).

In some implementations, processing the feature vectors through the classifier(s) may include: (1) combining two of more of the feature vectors, and (2) processing the combined feature vectors through the classifier(s). The classifier(s) may output scores on whether the combined audio segments contain voice and/or other information.

The voice component may be configured to identify one or more of the audio segments as containing voice. One or more of the audio segments may be identified as containing voice based on the scores, a two-step hysteresis thresholding, and/or other information. In some implementations, the identification of the one or more of the audio segments as containing voice may include identification of the one or more of the audio segments as containing cheering.

In some implementations, the two-step hysteresis thresholding may include a first hysteresis thresholding and a second hysteresis thresholding. The first hysteresis thresholding may label a given audio segment as containing voice based on comparison of a given score on whether the given audio segment contains voice to a first high threshold, comparison of the given score on whether the given audio segment contains voice to a first low threshold, a labeling of an adjacent audio segment, and/or other information. The second hysteresis thresholding may label a given combination of audio segments as containing voice based on comparison of a number of audio segments labeled as containing voice to a second high threshold, comparison of the number of audio segments labelled as containing voice to a second low threshold, a labeling of an adjacent combination of audio segments, and/or other information.

The storage component may be configured to effectuate storage the identification of the one or more of the audio segments as containing voice and/or other information in one or more storage media. The storage component may effectuate storage of the identification of one or more of the audio segments as containing voice and/or other information in one or more storage locations including the audio information and/or other storage locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
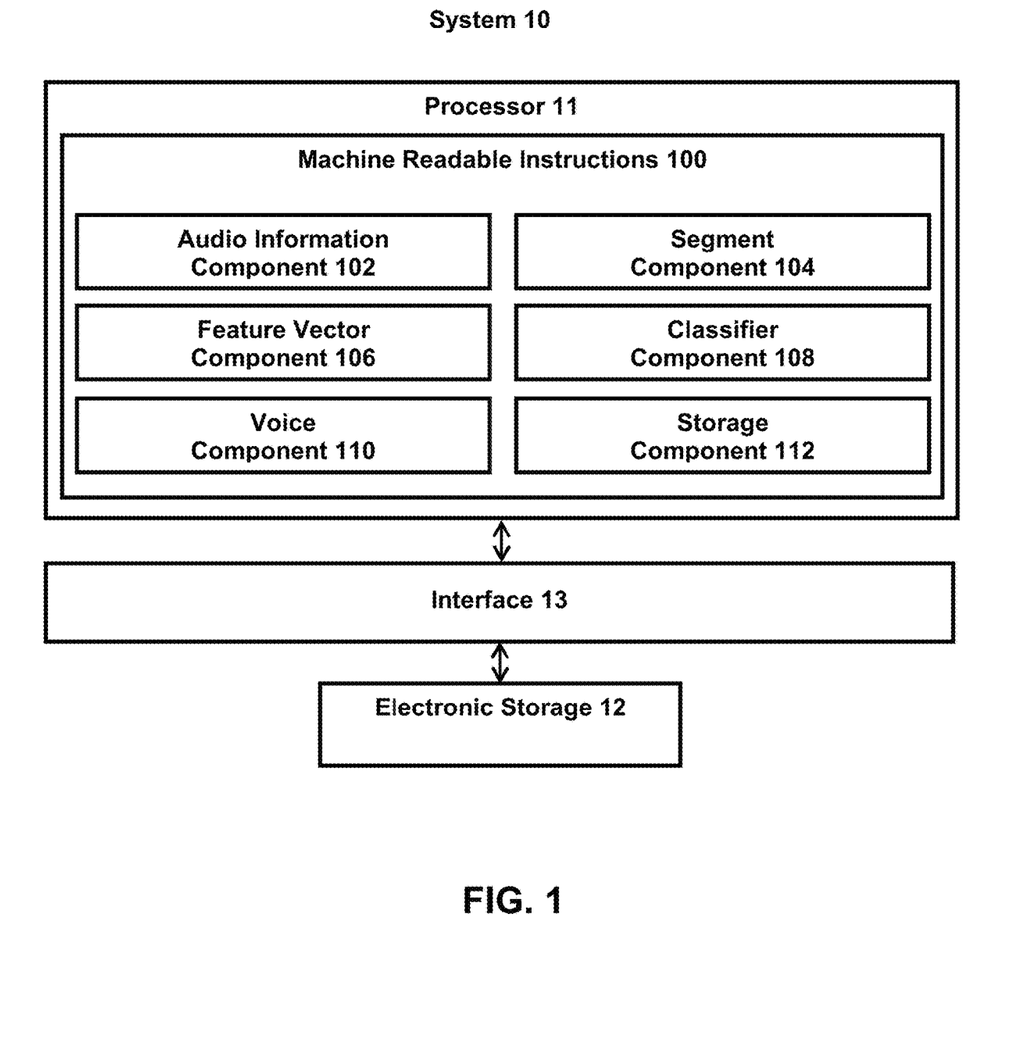
FIG. 1 illustrates a system that identifies voice within audio content.

FIG. 1 illustrates a system 10 for identifying voice within audio content. The system 10 may include one or more of a processor 11, an electronic storage 12, an interface 13 (e.g., bus, wireless interface), and/or other components. Audio information defining audio content may be accessed by the processor 11. The audio content may have a duration. The audio content may be segmented into audio segments. Individual audio segments may correspond to a portion of the duration. The audio segments may include a first audio segment corresponding to a first portion of the duration. Feature vectors of the audio segments may be determined. The feature vectors may include a first feature vector of the first audio segment. The feature vectors may be processed through a classifier. The classifier may output scores on whether the audio segments contain voice. One or more of the audio segments may be identified as containing voice based on the scores, a two-step hysteresis thresholding, and/or other information. Storage of the identification of the one or more of the audio segments as containing voice in one or more storage media may be effectuated.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to audio information, audio content, audio segment, feature vector, classifier, voice, hysteresis thresholding, score on whether audio segment contain voice, identification of audio segment as containing voice, and/or other information.

For example, the electronic storage 12 may store audio information defining one or more audio content and/or other information. Audio content may refer to media content that may be consumed as one or more sounds, such as words, songs, vocal sounds, non-vocal sounds, and/or other sounds. Audio content may include recorded sounds (e.g., captured via one or more sound sensors), computer-generated sounds, processed sounds, and/or other sounds. Audio content may include one or more sounds stored in one or more formats/containers, and/or other audio content. A format may refer to one or more ways in which the information defining audio content is arranged/laid out (e.g., file format). A container may refer to one or more ways in which information defining audio content is arranged/laid out in association with other information (e.g., wrapper format).

Audio content may have a duration. A duration may be defined in terms of time durations and/or other metrics. For example, audio content may include captured audio having a time duration of 60 seconds. Other times durations are contemplated.

In some implementations, audio content may be associated with video content. For example, the audio content may be captured during/with capture of the video content. That is, audio content may be captured during/with capture of one or more videos by an image capture device (including optical element(s), image sensor(s), processor(s)). The audio content may be captured by one or more sound sensors of the image capture device (e.g., microphone of and/or coupled to the image capture device) and/or captured by one or more sound sensors separate from the image capture device (e.g., microphone separate from the image capture device). The audio content may be stored with the video content (e.g., audio content may include audio portion of the video content) and/or separately from the video content (e.g., audio file is separate from video file).

The sound(s) within the audio content may correspond to the sound(s) that were captured when capturing the video content. For example, the video content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include cheering, speech, singing, whispering, shouting, yelling, screaming, booing, and/or other voice.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying voice within audio content. The machine readable instructions 100 may include one or more computer program components. The machine readable instructions 100 may include one or more of an audio information component 102, a segment component 104, a feature vector component 106, a classifier component 108, a voice component 110, a storage component 112, and/or other computer program components.

The audio information component 102 may be configured to access audio information defining one or more audio content and/or other information. Accessing audio information may include one or more of acquiring, analyzing, determining, examining, loading, locating, obtaining, opening, receiving, retrieving, reviewing, storing, and/or otherwise accessing the audio information. The audio information component 102 may obtain audio information from one or more locations. For example, the audio information component 102 may access audio information from a storage location, such as the electronic storage 12, electronic storage of information and/or signals generated by one or more sound sensors (not shown in FIG. 1), electronic storage of a device accessible via a network, and/or other locations. The audio information component 102 may obtain audio information from one or more hardware components (e.g., a sound sensor) and/or one or more software components (e.g., software running on a computing device).

The audio information component 102 may be configured to access audio information during acquisition of the audio content and/or after acquisition of the audio content by one or more sound sensors. For example, the audio information component 102 may access audio information while the sounds are being captured by one or more sound sensors. The audio information component 102 may access audio information defining sounds after the sounds have been captured and stored in memory (e.g., the electronic storage 12). For example, the processor 11 may be included within an image capture device that capture video content and the audio information component 102 may access audio information defining audio content for the video content during/after acquisition of the video content. As another example, the processor 11 may be included within a mobile/desktop device and the audio information component 102 may access audio information defining audio content for video content based on access of the video content by the mobile/desktop device.

In some implementations, the audio information may be accessed based on user interaction with a user interface/application (e.g., video editing application, audio editing application), and/or other information. For example, a user interface/application may provide option(s) for a user to select one or more audio content from which voice is to be detected. The audio information defining the audio content may be obtained based on the user's selection of the audio content and/or the video content including/associated with the audio content through the user interface/application. For example, the audio information may be accessed based on user selection (via user interface/application) of an audio file or a video file including/associated with an audio file/portion.

The segment component 104 may be configured to segment the audio content into audio segments. Individual audio segments may correspond to a portion of the duration of the audio content. For example, the audio segments may include a given audio segment corresponding to a given portion of the duration and/or other audio segment(s) corresponding to other portion(s) of the duration. The audio content may be segmented into audio segments of a same segment duration or different segment durations. For example, the segment component 104 may segment the audio content into audio segments having a duration of twenty-five milliseconds or other duration.

Figure 3:
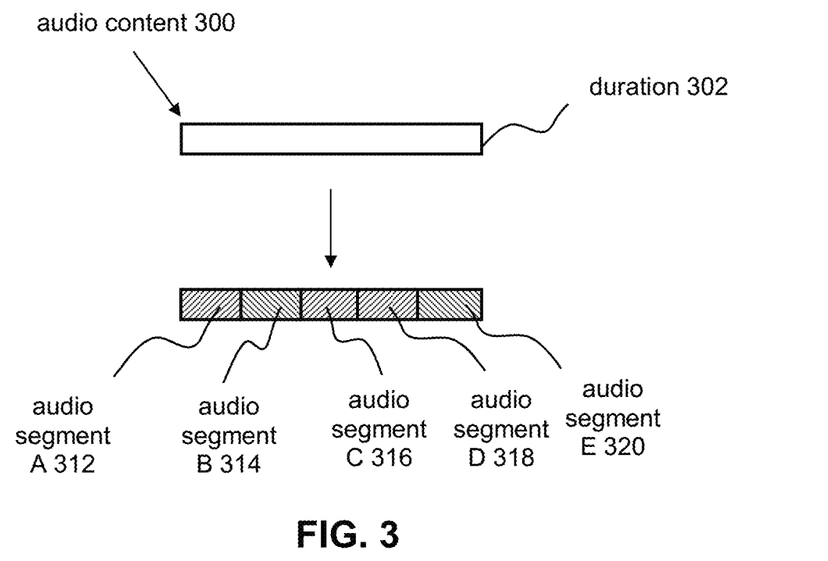
FIG. 3 illustrates an example segmentation of audio content.

FIG. 3 illustrates an example segmentation of audio content 300. The audio content 300 may have a duration 302. The segment component 104 may segment the audio content 300 into audio segment A 312, audio segment B 314, audio segment C 316, audio segment D 318, audio segment E 320, and/or other audio segments. The audio segment A 312, the audio segment B 314, the audio segment 316, the audio segment D 318, and the audio segment E 320 may be of a same segment duration (e.g., twenty-five milliseconds) or different segment durations. In some implementations, audio segments segmented by the segmentation component 104 may include overlap between adjacent audio segments. In some implementations, audio segments segmented by the segmentation component 104 may not include overlap between adjacent audio segments. Other segmentations of audio content are contemplated.

Segmentation of the audio content may provide for preservation of frequency contours within the signal of the audio content during sound analysis/processing. For example, performing Fourier transform over the entire duration of the audio content (entire signal) may result in loss of the frequency contours of the audio signal over time. Performing Fourier transform over the audio segments (of short time duration) may provide an approximation of the frequency contours of the signal.

Figure 4:
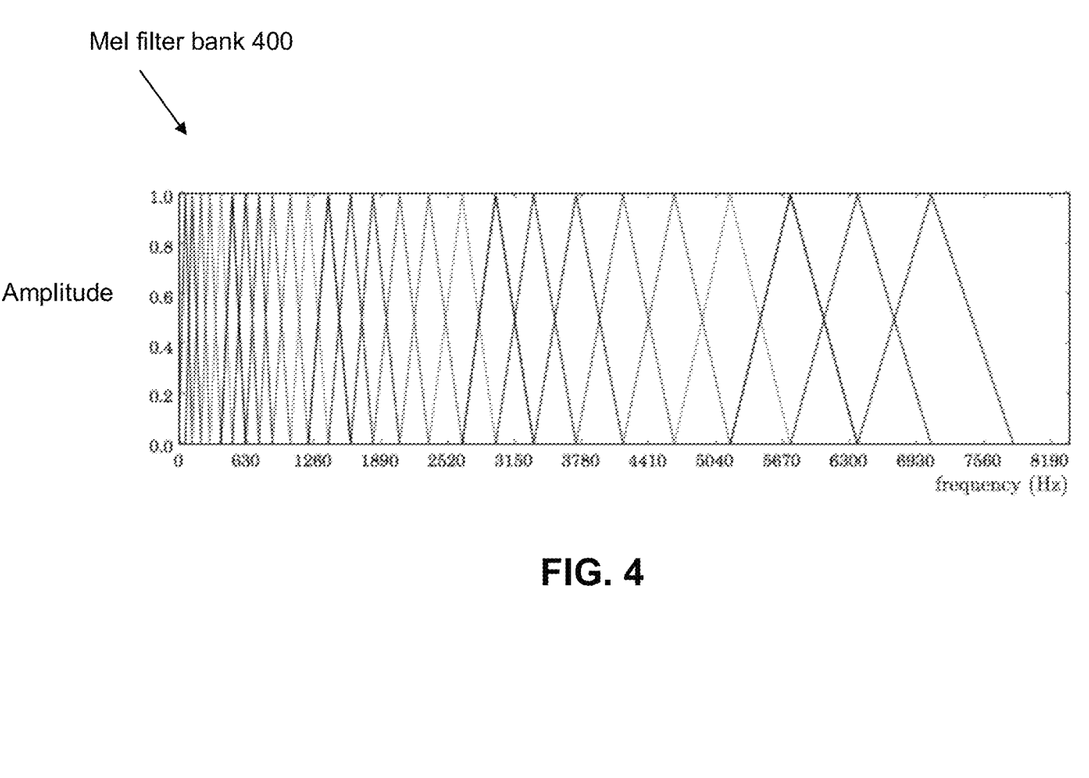
FIG. 4 illustrates an example Mel filter bank.

The feature vector component 106 may be configured to determine feature vectors of the audio segments. The feature vectors may include a first feature vector of the first audio segment and/or other feature vector(s) of other audio segment(s). The feature vectors may be determined based on application of one or more Mel filter banks to the audio segments/representations of audio segments. FIG. 4 illustrates an example Mel filter bank 400, which may be applied to the audio segments/representations of audio segments to determine feature vectors.

A Mel filter bank (e.g., the Mel filter bank 400) may be expanded or contracted, and/or scaled based on a sampling rate of the audio content. The expansion/contraction and scaling of the Mel filter bank may account for different sampling rate of the audio content. For example, a Mel filter bank may be sized for application to audio content with sampling rate 44.1 kHz. If audio content to be analyzed for voice is of different sampling rate, the size of the Mel filter bank may be adapted (expanded/contracted and scaled) to account for the difference in sampling rate. Dilation coefficient may be given by the sampling rate of the audio content divided by the reference sampling rate.

Such adaption of the Mel filter bank may provide for audio segment feature vector extraction that is independent of the audio content sampling rate. That is, the adaptation of the Mel filter bank may provide for flexibility in extracting feature vectors of audio content with different sampling rates. Different sampling rates may be accounted for via transformation in the frequency domain rather than in the time domain, allowing for removing of features as if they were extracted at the sampling rate of reference.

Figure 5:
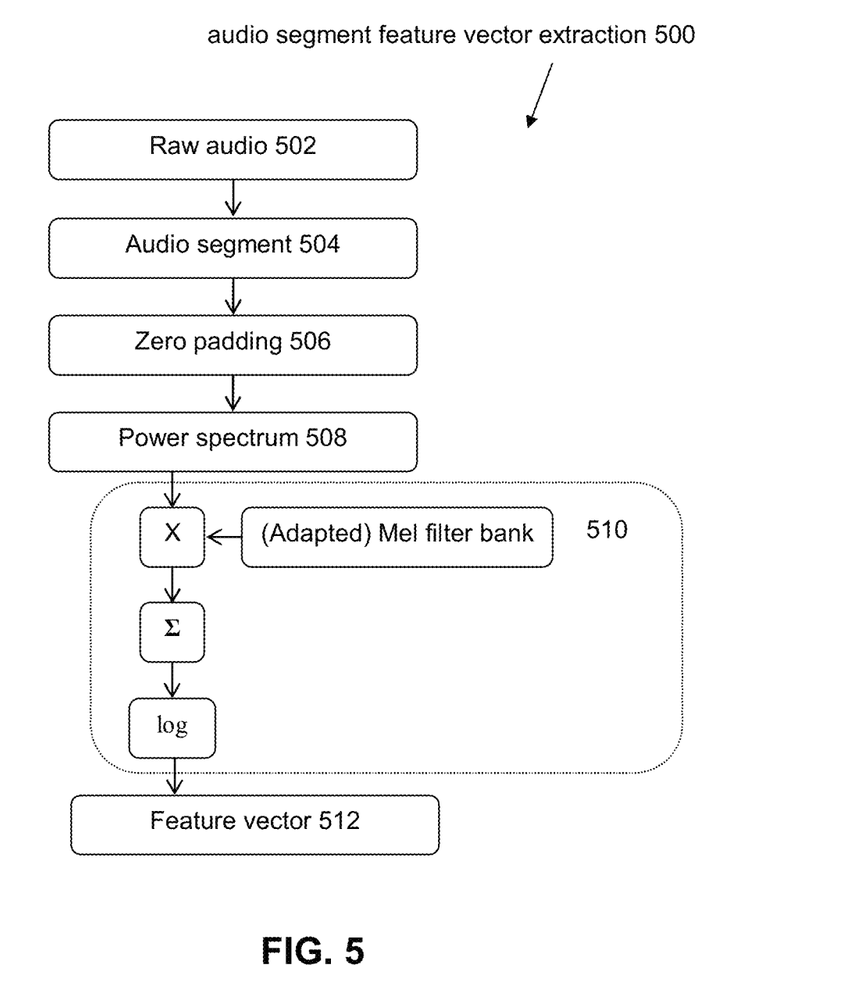
FIG. 5 illustrates an example audio segment feature vector extraction.

FIG. 5 illustrates an example audio segment feature vector extraction 500. As shown in FIG. 5, raw audio 502 (of a given sampling rate) may be segmented. Zero padding 506 may be applied to an audio segment 504 (of a given duration, such as twenty-five milliseconds) of the audio content. Zero padding 506 may be applied to pad the signal within the audio segment 504 to a fixed size vector length. The audio segment 504 may be zero padded at the beginning, at the end, and/or at the beginning and the end. For example, the audio segment may be zero padded to a length of 2048. A length of 2048 may provide for sampling in twenty-five millisecond windows. Other lengths are contemplated.

Fast Fourier transform may be computed to obtain power spectrum 508 of the zero-padded audio segment. Application of the Mel filter bank 510 may include (1) multiplication of the power spectrum 508 with the filters of the Mel filter bank (the Mel filter bank may be adapted based on the sampling rate of the audio content.), (2) summation of the values to compute the energies, and (3) application of a log function. Normalization may be performed by subtracting the log of the energy of the audio segment, and the normalized energies may be concatenated to obtain the feature vector 512.

The classifier component 108 may be configured to process the feature vectors and/or other information through one or more classifier. A classifier may be a supervised learning model with associated learning algorithm. A classifier may be used for classification and/or regression. In some implementations, a classifier may include a random forest classifier, a recurrent neural network (e.g., Long Short Term Memory network), and/or other classifiers. In some implementations, a particular classifier may be used based on the resources (e.g., power, computing, time, memory) available for usage. For example, a random forest classifier may provide for fast and light weight classification while LSTM may provide more accurate classification at the expense of computing resources.

In some implementations, the classifier may be trained with one or more data sets (e.g., audio data sets including videos marked as containing/not containing certain voice, such as cheering). Different classifier(s) may be used and/or classifier(s) may be trained with different data set(s) based on the type of voice that is desired to be identified within audio content. In some implementations, the classification of the feature vectors described herein may be combined with other signal processing features (e.g., based on energy, frequency, entropy, spectral power, Cepstral coefficient).

A classifier may output scores on whether the audio segments contain voice based on the inputted feature vectors and/or other information. The scores may provide one or more measures of the audio segments containing voice. For example, for a given feature vector of a given audio segment, the classifier may output a score on whether the given audio segment contains a certain type of voice (e.g., cheering). The score may be provided using a given metric, such as a value between zero and one, where the value of zero represents a score that the given audio segment does not contain voice (or vice versa), the value of one represents a score that the given audio segment contains voice, and the values in between represent the in-between probabilities. Uses of other metrics are contemplated.

Figure 6:
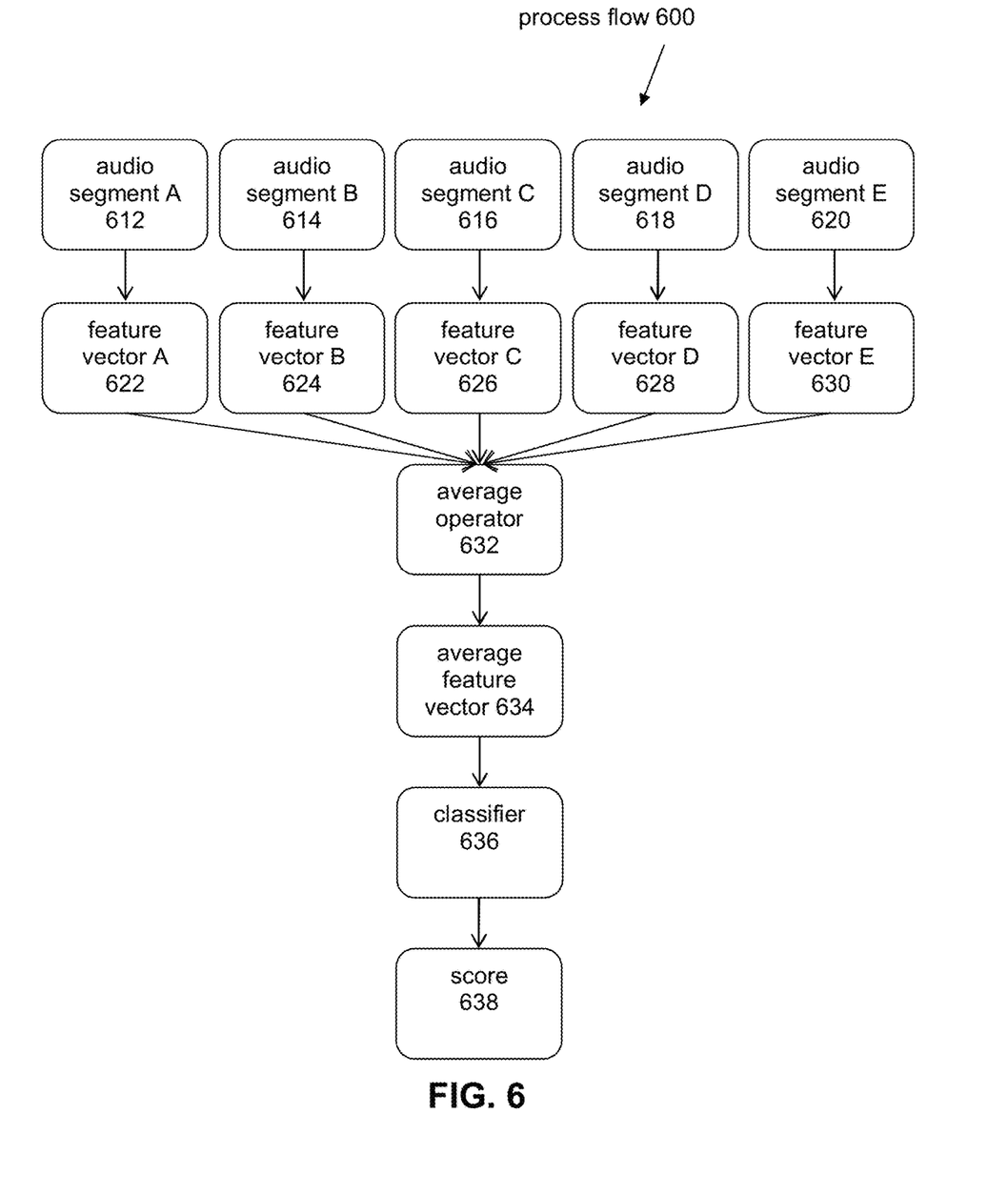
FIG. 6 illustrates an example process flow for identifying voice within multiple audio segments.

In some implementations, processing the feature vectors through the classifier(s) may include: (1) combining two of more of the feature vectors, and (2) processing the combined feature vectors through the classifier(s). The classifier(s) may output scores on whether the combined audio segments contain voice and/or other information. FIG. 6 illustrates an example process floor 600 for identifying voice within multiple audio segments. As shown in FIG. 6, feature vectors 622, 624, 626, 628, 630 may be obtained from audio segments 612, 614, 616, 618, 620. The feature vectors 622, 624, 626, 628, 630 may be combined through an average operate 632, which results in a combined feature vector (an average feature vector 634). The average feature vectors 634 may be processed through a classifier 636, which may output a score 638 providing a measurement on whether the audio segments 612, 614, 616, 618, 620 contain voice. For example, individual audio segments 612, 614, 616, 618, 620 may include a twenty-five millisecond duration of the audio content and the classifier 636 may provide a score on whether a hundred and twenty-five millisecond duration of the audio content contains voice.

The voice component 110 may be configured to identify one or more of the audio segments as containing voice. The voice component 110 may identify one or more of the audio segments as containing voice based on the scores on whether the audio segments contain voice, a two-step hysteresis thresholding, and/or other information. For example, the voice component 110 may identify one or more of the audio segments as containing voice based on the scores on whether the audio segments contain voice, the two-step hysteresis thresholding, and/or other information. Identification of other types of voice are contemplated.

A two-step hysteresis thresholding may provide for stabilization of classification on whether audio segments contain voice. A two-step hysteresis thresholding may include (1) a hysteresis thresholding that takes into account scores of a given audio segment/given grouping of audio segments and labeling of another audio segment/grouping of audio segments (e.g., adjacent audio segment/grouping of audio segments, preceding audio segment/grouping of audio segments, subsequent audio segment/grouping of audio segments), and (2) a hysteresis thresholding that takes into account scores of a given grouping of audio segment/larger grouping of audio segments and labeling of another grouping of audio segment/larger grouping of audio segments (e.g., adjacent grouping of audio segments, preceding grouping of audio segments, subsequent grouping of audio segments).

For example, the two-step hysteresis thresholding may include a first thresholding and a second hysteresis thresholding. The first hysteresis thresholding may operate on a different level/grouping of audio segments than the second hysteresis thresholding. For example, the first hysteresis thresholding may label a given audio segment as containing voice based on the comparison of a given score on whether the given audio segment contains voice (outputted by a classifier) to a first high threshold, comparison of the given score on whether the given audio segment contains voice to a first low threshold, a labeling of an adjacent audio segment, and/or other information. The second hysteresis thresholding may label a given combination of audio segments as containing voice based on comparison of a number of audio segments labeled as containing voice (outputted by the first hysteresis thresholding) to a second high threshold, comparison of the number of audio segments labelled as containing voice to a second low threshold, a labeling of an adjacent combination of audio segments, and/or other information.

Figure 7:
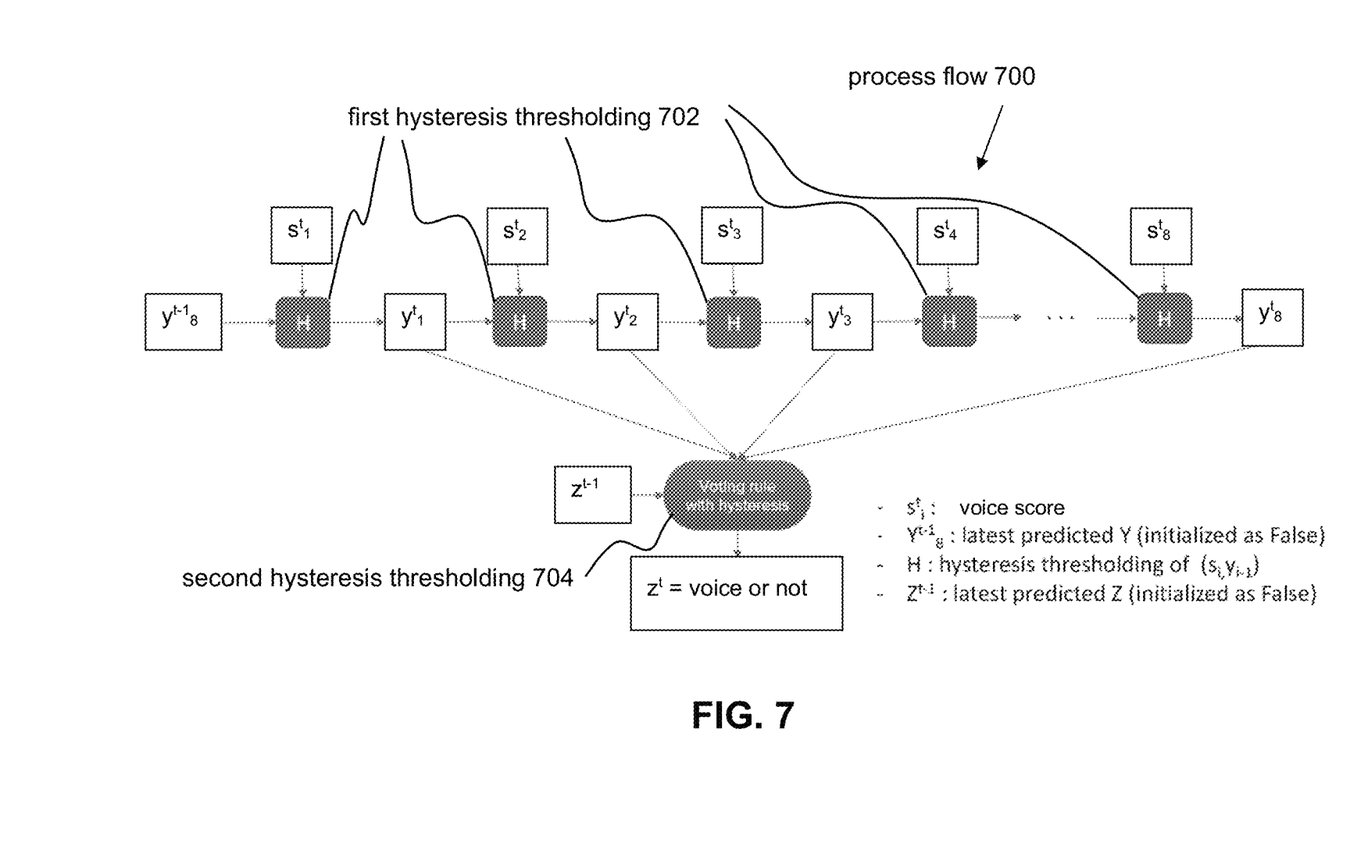
FIG. 7 illustrates an example process flow for identifying voice within audio segments.

For example, FIG. 7 illustrates an example process flow 700 for identifying voice within audio segments. Different groupings of audio segments may be processed through the process flow 700 to identify different durations of audio content as containing voice. For example, a grouping of audio segments representing a hundred and twenty-five millisecond duration of the audio content may be processed through the first hysteresis thresholding 702 and a grouping of audio segments representing a one second duration of the audio content (e.g., a grouping of eight audio segments individually representing a hundred and twenty-five millisecond duration of the audio content) may be processed through the second hysteresis thresholding 704. Such processing of audio segments may result in identification of whether one-second durations of audio content contain voice. Usage of other levels/groupings of audio segments in the two-step hysteresis thresholding are contemplated.

The first hysteresis thresholding 702 may classify a given audio segment as containing voice by comparing the score on whether the given audio segment contains voice ($s^t_i$ voice score) to a high threshold and a low threshold. If the score satisfies the high threshold (e.g., voice score is greater than the high threshold; voice score is greater or equal to the high threshold), then the given audio segment may be labeled ($y^t_i$) as containing voice. If the score satisfies the low threshold (e.g., voice score is less than the low threshold; voice score is less than or equal to the low threshold), then the given audio segment may be labeled as not containing voice. The usage of the high threshold as representing a higher value and the low threshold as representing a lower value is merely for ease of explanation and is not meant to be limiting. In some implementations, the high threshold may represent a lower value and the low threshold may represent a higher value.

If the score does not satisfy the high threshold or the low threshold (e.g., voice score is equal to the high threshold or the low threshold; voice score is between the high threshold and the low threshold), then the given audio segment may be labeled the same way as the labeling of a preceding audio segment ($y^t_{t-1}$). If the preceding audio segment was labelled as containing voice, then the given audio segment may be labeled as containing voice. If the preceding audio segment was labelled as not containing voice, then the given audio segment may be labeled as not containing voice. In some implementations, if there is no preceding audio segment, the given audio segment may be labeled as not containing voice. In some implementations, if there is no preceding audio segment, the given audio segment may be labeled as containing voice.

The second hysteresis thresholding 704 may classify a given combination of audio segments as containing voice by comparing the number of audio segments within the combination of audio segments that are labeled as containing voice (outputted by the first hysteresis thresholding 702) to a high threshold and a low threshold. If the number of audio segments labeled as containing voice satisfies the high threshold (e.g., number of audio segments labeled as containing voice is greater than the high threshold; number of audio segments labeled as containing voice is greater or equal to the high threshold), then the given combination of audio segments may be labeled (Z) as containing voice. If the number of audio segments labeled as containing voice satisfies the low threshold (e.g., number of audio segments labeled as containing voice is less than the low threshold; number of audio segments labeled as containing voice is less than or equal to the low threshold), then the given combination of audio segments may be labeled as not containing voice. The usage of the high threshold as representing a higher value and the low threshold as representing a lower value is merely for ease of explanation and is not meant to be limiting. In some implementations, the high threshold may represent a lower value and the low threshold may represent a higher value. In some implementations, the number of audio segments labeled as not containing voice may be compared to the thresholds.

If the number of audio segments labeled as containing voice does not satisfy the high threshold or the low threshold (e.g., number of audio segments labeled as containing voice is equal to the high threshold or the low threshold; number of audio segments labeled as containing voice is between the high threshold and the low threshold), then the given combination of audio segments may be labeled the same way as the labeling of a preceding combination of audio segments ($z^{t-1}$). If the preceding combination of audio segments was labelled as containing voice, then the given combination of audio segments may be labeled as containing voice. If the preceding combination of audio segments was labelled as not containing voice, then the given combination of audio segments may be labeled as not containing voice. In some implementations, if there is no preceding combination of audio segments, the given combination of audio segments may be labeled as not containing voice. In some implementations, if there is no preceding combination of audio segments, the given combination of audio segments may be labeled as not containing voice. Other types of/rules for two-step hysteresis thresholding are contemplated.

The threshold values in a two-step hysteresis thresholding may be adjusted to change the accuracy of the voice identification. For example, the high threshold in the second hysteresis thresholding 704 may be lowered/increased to identify voice contained in audio segments with lower/higher precision or recall. In some implementations, the threshold values in a two-step hysteresis thresholding may change based on the type of voice being identified, based on precision desired, and/or other information. For example, the threshold values for identifying cheering in audio content may be same as or different than the threshold values for identifying speech in audio content. As another example, different threshold values may be associated with different levels of precision. Other changes in threshold values are contemplated.

The identification of the one or more of the audio segments as containing voice (e.g., cheering) may be used to identify one or more moments within the audio content and/or one or more moments within the associated video content (e.g., identifying time portions of a video based on cheering contained within audio of the video). For example, the identification of audio segments containing particular voice (e.g., cheering) may be used to trim the audio content and/or the associated video content to remove undesirable portions (e.g., quiet moments) and/or to keep desirable portions (e.g., moments of interest indicated by cheering). The identification of audio segments containing particular voice may be used to emphasize certain portions of the video content. For example, visual effects (e.g., color changes, pixel manipulation, transitions) may be added to the video content based on the identification of audio segments containing particular voice (e.g., add transitions between/during voice). The video content may be played back with musical track (e.g., video content may be synchronized for playback with musical track) and the identification of audio segments (audio portions of the video content) containing particular voice may be used to include the voice during playback so that the voice is heard above/in place of the musical track (audio portion of the video content plays on top of or replaces the musical track for a duration; volume of the audio portion of the video content is increased).

In some implementations, the identification of the one or more audio segments as containing voice may be used to determine where within the video space an event of interest is occurring. For example, the video content may include spherical capture of a scene, and based on identification of a particular moment as being interesting based on identification of voice, the particular moment may be analyzed to determine where within the video content the event of interest captured (e.g., in which viewing direction and/or viewing size of the spherical video content the event of interest is captured). The analysis may be performed using visual analysis/computer vision, audio analysis (e.g., analyzing directionality of the sounds captured within the audio content), and/or other information. Such determination of viewing direction/viewing size at which the event of interest is captured may enable providing a punch-out view of the visual extents of the video content that include the event of interest.

The storage component 112 may be configured to effectuate storage of the identification of the one or more of the audio segments as containing voice and/or other information in one or more storage media. The identification of the one or more of the audio segments as containing voice may be stored with the audio content, separately from the audio content, with the associated video content, separately from the associated video content, and/or in other forms. In some implementations, the identification of the one or more of the audio segments as containing voice may be stored within a file (e.g., director track) that describes how the audio content and/or the associated video content may be presented during playback.

In some implementations, the storage component 112 may effectuate storage of the identification of the one or more of the audio segments as containing voice in one or more storage locations including the audio information and/or other storage locations. For example, the audio information may have been accessed from the electronic storage 12 and the identification of the one or more of the audio segments as containing voice may be stored in the electronic storage 12. In some implementations, the storage component 112 may effectuate storage of the identification of the one or more of the audio segments as containing voice in one or more remote storage locations (e.g., storage media located at/accessible through a server). In some implementations, the storage component 112 may effectuate storage of the identification of the one or more of the audio segments as containing voice through one or more intermediary devices. Other storage locations for storage of the identification of the one or more of the audio segments as containing voice are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 12, and the display 14 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
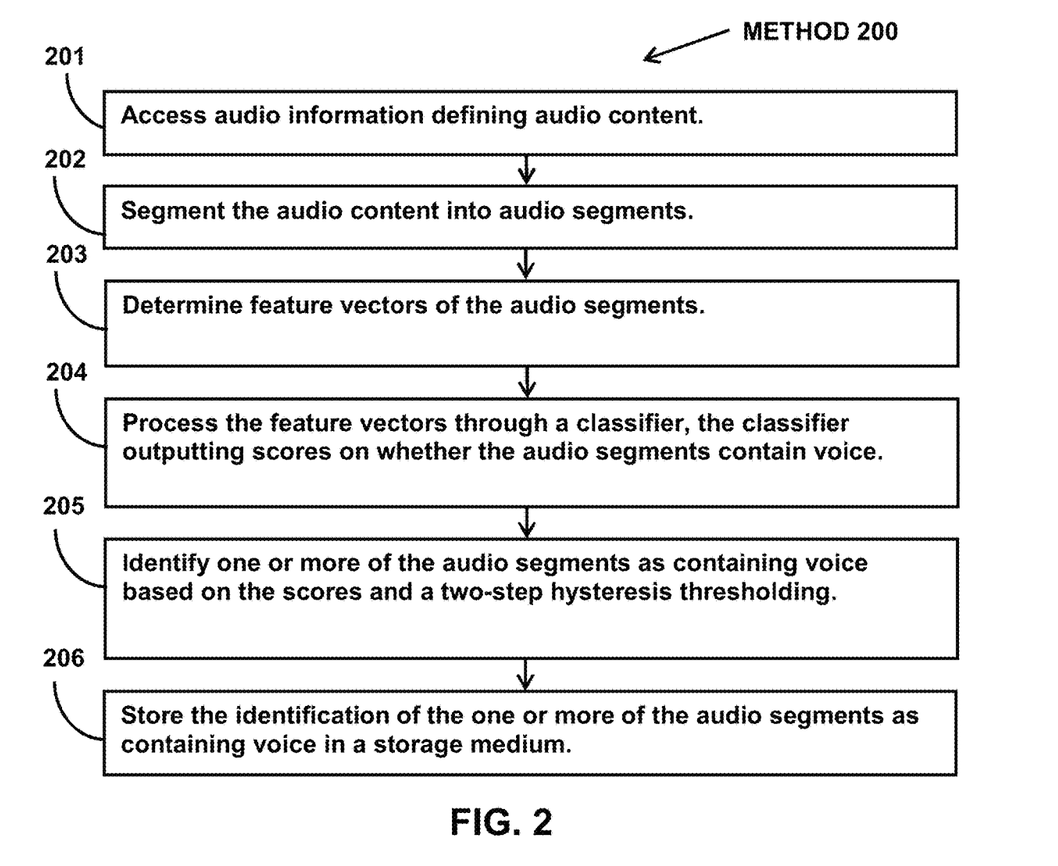
FIG. 2 illustrates a method for identifying voice within audio content.

FIG. 2 illustrates method 200 for identifying voice within audio content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, audio information defining audio content may be accessed. The audio content may have a duration. In some implementation, operation 201 may be performed by a processor component the same as or similar to the audio information component 102 (Shown in FIG. 1 and described herein).

At operation 202, the audio content may be segmented into audio segments. Individual audio segments may correspond to a portion of the duration. In some implementations, operation 202 may be performed by a processor component the same as or similar to the segment component 104 (Shown in FIG. 1 and described herein).

At operation 203, feature vectors of the audio segments may be determined. In some implementations, operation 203 may be performed by a processor component the same as or similar to the feature vector component 106 (Shown in FIG. 1 and described herein).

At operation 204, the feature vectors may be processed through a classifier. The classifier may output scores on whether the audio segments contain voice. In some implementations, operation 204 may be performed by a processor component the same as or similar to the classifier component 108 (Shown in FIG. 1 and described herein).

At operation 205, one or more of the audio segments may be identified as containing voice based on the scores and a two-step hysteresis thresholding. In some implementations, operation 205 may be performed by a processor component the same as or similar to the voice component 110 (Shown in FIG. 1 and described herein).

At operation 206, the identification of the one or more of the audio segments as containing voice may be stored in a storage medium. In some implementations, operation 206 may be performed by a processor component the same as or similar to the storage component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies voice within audio, the system comprising:
one or more physical processors configured by machine-readable instructions stored in a non-transitory storage medium to:
access audio information defining audio content, the audio content having a duration and including audio segments, individual audio segments corresponding to a portion of the duration;
process feature vectors of the audio segment through a classifier, the classifier outputting scores on whether the audio segments contain voice; and
identify one or more of the audio segments as containing voice based on the scores and a two-step hysteresis thresholding, the two-step hysteresis thresholding including a first hysteresis thresholding for labeling individual audio segments and a second hysteresis thresholding for labeling individual groupings of audio segments, the individual groupings of audio segments including multiple audio segments, the first hysteresis thresholding different from the second hysteresis thresholding, wherein:
the first hysteresis thresholding is performed for a given audio segment based on (i) a corresponding score on whether the given audio segment contains voice and (ii) a labeling of an adjacent audio segment;
the second hysteresis thresholding is performed for a given grouping of audio segments based on (i) a number of audio segments in the given grouping of audio segments labeled as containing voice and (ii) a labeling of an adjacent grouping of audio segments.

2. The system of claim 1, wherein the identification of the one or more of the audio segments as containing voice includes identification of the one or more of the audio segments as containing cheering.

3. The system of claim 1, wherein the one or more physical processors are, to process the feature vectors through the classifier, further configured by the machine-readable instructions to:
combine two or more of the feature vectors; and
process the combined feature vectors through the classifier, the classifier outputting scores on whether the combined audio segments contain voice.

4. The system of claim 1, wherein the audio segments have a segment duration of twenty-five milliseconds.

5. The system of claim 1, wherein the feature vectors are determined based on application of a Mel filter bank.

6. The system of claim 5, wherein the Mel filter bank is expanded or contracted, and scaled based on a sampling rate of the audio content.

7. The system of claim 1, wherein the classifier includes a random forest classifier or a recurrent neural network.

8. The system of claim 1, wherein the first hysteresis thresholding:
labels the given audio segment as containing voice based on the corresponding score indicating that the given audio segment contains voice;
labels the given audio segment as not containing voice based on the corresponding score indicating that the given audio segment does not contain voice;
labels the given audio segment as containing voice based on the corresponding score being inconclusive as to whether the given audio segment does or does not contain voice and the labeling of the adjacent audio segment as containing voice; and
labels the given audio segment as not containing voice based on the corresponding score being inconclusive as to whether the given audio segment does or does not contain voice and the labeling of the adjacent audio segment as not containing voice.

9. The system of claim 8, wherein the second hysteresis thresholding:
labels the given grouping of audio segments as containing voice based on the number of audio segments in the given grouping of audio segments labeled as containing voice indicating that the given grouping of audio segments contains voice;
labels the given grouping of audio segments as not containing voice based on the number of audio segments in the given grouping of audio segments labeled as containing voice indicating that the given audio segment does not contain voice;
labels the given grouping of grouping of audio segments as containing voice based on the number of audio segments in the given grouping of audio segments labeled as containing voice being inconclusive as to whether the given grouping of audio segments does or does not contain voice and the labeling of the adjacent grouping audio segments as containing voice; and
labels the given grouping of audio segments as not containing voice based on the number of audio segments in the given grouping of audio segments labeled as containing voice being inconclusive as to whether the given grouping of audio segments does or does not contain voice and the labeling of the adjacent grouping audio segments as not containing voice.

10. The system of claim 9, wherein:
the corresponding score indicates that the given audio segment contains voice based on the corresponding score satisfying a first high threshold;
the corresponding score indicates that the given audio segment does not contain voice based on the corresponding score satisfying a first low threshold;
the corresponding score is inconclusive as to whether the given audio segment does or does not contain voice based on the corresponding score not satisfying the first high threshold and the first low threshold;
the number of audio segments in the given grouping of audio segments labeled as containing voice indicates that the given grouping of audio segments contains voice based on the number of audio segments in the given grouping of audio segments labeled as containing voice satisfying a second high threshold;
the number of audio segments in the given grouping of audio segments labeled as containing voice indicates that the given grouping of audio segments does not contain voice based on the number of audio segments in the given grouping of audio segments labeled as containing voice satisfying a second low threshold;
the number of audio segments in the given grouping of audio segments labeled as containing voice is inconclusive as to whether the given grouping of audio segments does or does not contain voice based on the number of audio segments in the given grouping of audio segments labeled as containing voice not satisfying the second high threshold and the second low threshold.

11. A method for identifying voice within audio, the method performed by a computing system including one or more physical processors, the method comprising:
accessing, by the computing system, audio information defining audio content, the audio content having a duration and including audio segments, individual audio segments corresponding to a portion of the duration;
processing, by the computing system, feature vectors of the audio segments through a classifier, the classifier outputting scores on whether the audio segments contain voice; and
identifying, by the computing system, one or more of the audio segments as containing voice based on the scores and a two-step hysteresis thresholding, the two-step hysteresis thresholding including a first hysteresis thresholding for labeling individual audio segments and a second hysteresis thresholding for labeling individual groupings of audio segments, the individual groupings of audio segments including multiple audio segments, the first hysteresis thresholding different from the second hysteresis thresholding, wherein:
the first hysteresis thresholding is performed for a given audio segment based on (i) a corresponding score on whether the given audio segment contains voice and (ii) a labeling of an adjacent audio segment;
the second hysteresis thresholding is performed for a given grouping of audio segments based on (i) a number of audio segments in the given grouping of audio segments labeled as containing voice and (ii) a labeling of an adjacent grouping of audio segments.

12. The method of claim 11, wherein the identification of the one or more of the audio segments as containing voice includes identification of the one or more of the audio segments as containing cheering.

13. The method of claim 11, wherein processing the feature vectors through the classifier includes:
combining two or more of the feature vectors; and
processing the combined feature vectors through the classifier, the classifier outputting scores on whether the combined audio segments contain voice.

14. The method of claim 11, wherein the audio segments have a segment duration of twenty-five milliseconds.

15. The method of claim 11, wherein the feature vectors are determined based on application of a Mel filter bank.

16. The method of claim 15, wherein the Mel filter bank is expanded or contracted, and scaled based on a sampling rate of the audio content.

17. The method of claim 11, wherein the classifier includes a random forest classifier or a recurrent neural network.

18. The method of claim 11, wherein the first hysteresis thresholding:
labels the given audio segment as containing voice based on the corresponding score indicating that the given audio segment contains voice;
labels the given audio segment as not containing voice based on the corresponding score indicating that the given audio segment does not contain voice;
labels the given audio segment as containing voice based on the corresponding score being inconclusive as to whether the given audio segment does or does not contain voice and the labeling of the adjacent audio segment as containing voice; and
labels the given audio segment as not containing voice based on the corresponding score being inconclusive as to whether the given audio segment does or does not contain voice and the labeling of the adjacent audio segment as not containing voice.

19. The method of claim 18, wherein the second hysteresis thresholding:

labels the given grouping of audio segments as containing voice based on the number of audio segments in the given grouping of audio segments labeled as containing voice indicating that the given grouping of audio segments contains voice;

labels the given grouping of audio segments as not containing voice based on the number of audio segments in the given grouping of audio segments labeled as containing voice indicating that the given audio segment does not contain voice;

labels the given grouping of grouping of audio segments as containing voice based on the number of audio segments in the given grouping of audio segments labeled as containing voice being inconclusive as to whether the given grouping of audio segments does or does not contain voice and the labeling of the adjacent grouping audio segments as containing voice; and labels the given grouping of audio segments as not containing voice based on the number of audio segments in the given grouping of audio segments labeled as containing voice being inconclusive as to whether the given grouping of audio segments does or does not contain voice and the labeling of the adjacent grouping audio segments as not containing voice.

20. The method of claim 19, wherein:

the corresponding score indicates that the given audio segment contains voice based on the corresponding score satisfying a first high threshold;

the corresponding score indicates that the given audio segment does not contain voice based on the corresponding score satisfying a first low threshold;

the corresponding score is inconclusive as to whether the given audio segment does or does not contain voice based on the corresponding score not satisfying the first high threshold and the first low threshold;

the number of audio segments in the given grouping of audio segments labeled as containing voice indicates that the given grouping of audio segments contains voice based on the number of audio segments in the given grouping of audio segments labeled as containing voice satisfying a second high threshold;

the number of audio segments in the given grouping of audio segments labeled as containing voice indicates that the given grouping of audio segments does not contain voice based on the number of audio segments in the given grouping of audio segments labeled as containing voice satisfying a second low threshold;

the number of audio segments in the given grouping of audio segments labeled as containing voice is inconclusive as to whether the given grouping of audio segments does or does not contain voice based on the number of audio segments in the given grouping of audio segments labeled as containing voice not satisfying the second high threshold and the second low threshold.

* * * * *